April 29, 1958 R. SCHUSTER 2,832,383
KNIFE EDGE GUIDING DEVICE FOR WOODWORKING MACHINES
Filed July 26, 1954 2 Sheets-Sheet 1
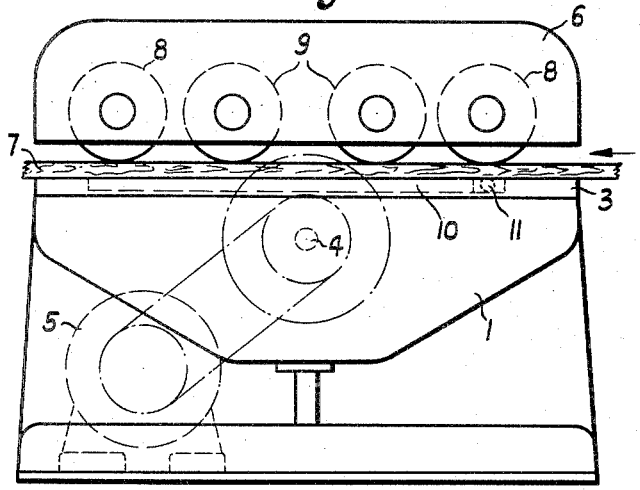
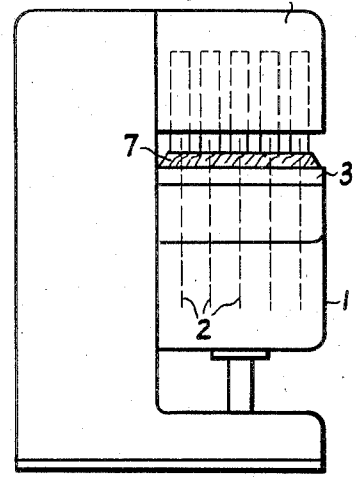
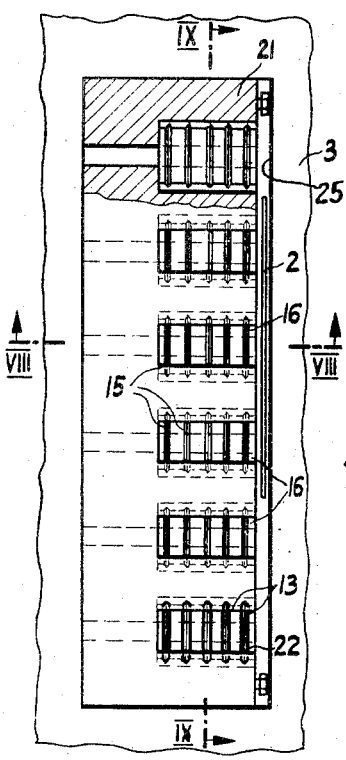
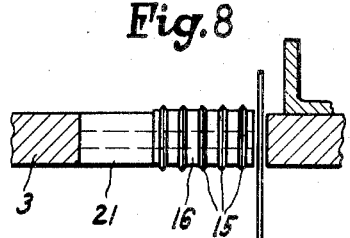
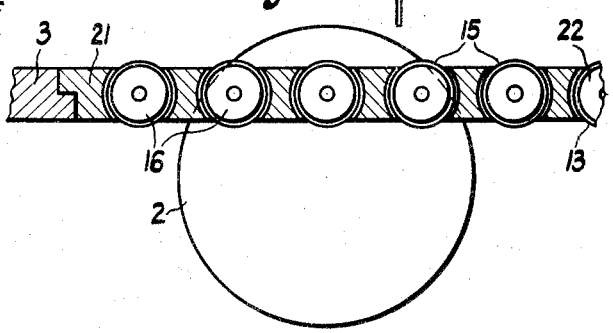
INVENTOR.
R. Schuster

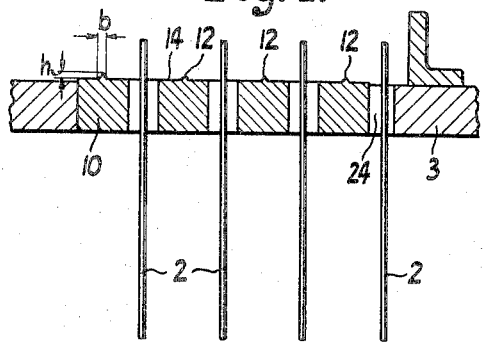
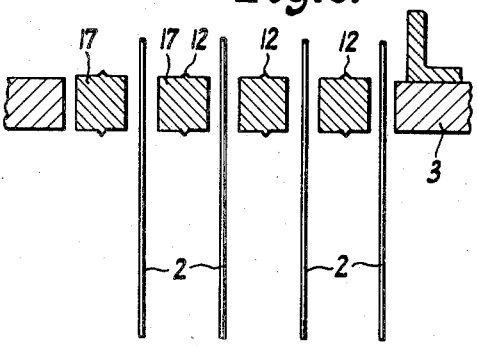
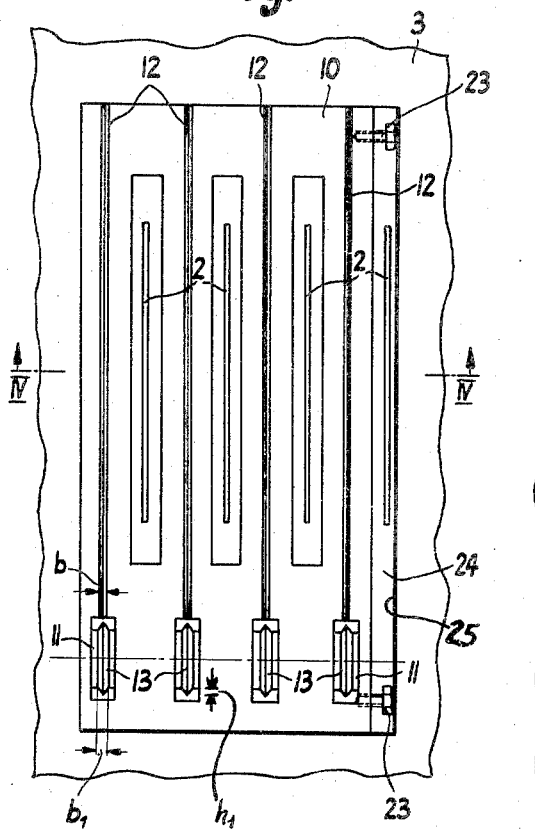
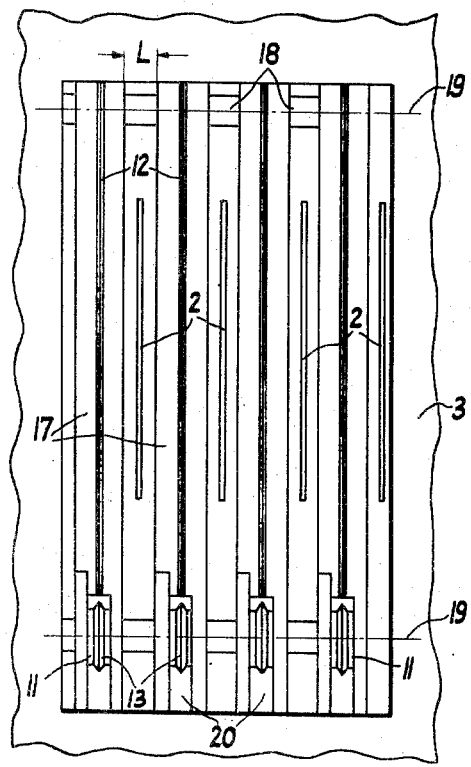

United States Patent Office 2,832,383
Patented Apr. 29, 1958

2,832,383
KNIFE EDGE GUIDING DEVICE FOR WOODWORKING MACHINES

Roman Schuster, Neu-Ulm, Bavaria, Germany

Application July 26, 1954, Serial No. 445,800

8 Claims. (Cl. 144—253)

This invention relates to a guiding device for woodworking machines, more particularly, circular saws.

It is an object of the present invention to provide simple, cheap, and reliable means by which the workpieces or boards are safely guided in the feeding direction not only in the moment of cutting, but during the entire passage of the workpiece through the machine and especially after the cutting operation.

With this and further objects in view, according to the present invention the guiding device comprises guide means, more particularly, narrow guide strips, projecting from the machine table, and cutting rollers each having an annular edge and being provided in front of its associated guide strip for cooperation with a feed roller arranged above the cutting roller, so as to cut or roll into the workpiece a guide groove adapted to be engaged by the associated edge-shaped guide strip whose cross section corresponds to the profile of the annular edge of the associated cutting roller.

My novel guiding device operates in such a way that at first fine grooves are rolled or cut into the under side of the work by means of the cutting rollers, i. e., with a very small force which does not impede the passage of the work in any way whatever. It will be understood that the "cutting" rollers actually act to "roll" a groove into the wood without removing any chips. On further feeding of the work the guide strips engage in said grooves, thus safely preventing any lateral displacement of the board or of the cut ledges and ensuring an accurately straight guiding of the wooden battens, ledges, or the like even after the cutting action, so that the ledges which sometimes tend to deviate from their original direction by structural tensions released by the cutting, cannot be deformed by the rearward periphery of the saw blade. It will be understood that owing to the previously cut grooves there is no clamping or jamming action between the wood and the guide strips, but the work engages the machine table in a normal way and accordingly a smooth passage of the work through the machine is ensured which practically does not require a greater force than in case of normal circular saws without guide strips.

Other and further objects, features and advantages of the invention will be pointed out hereinafter and appear in the appended claims forming part of the application.

In the accompanying drawings several now preferred embodiments of the invention are shown by way of illustration and not by way of limitation.

Fig. 1 is a front view of a circular saw including a guiding device having the invention applied thereto, Fig. 2 is a side view thereof, Fig. 3 is a top plan view on the machine table with the guiding device, Fig. 4 is a cross section through the guiding device on line IV—IV of Fig. 3, Figs. 5 and 6 are views similar to Figs. 3 and 4, respectively, but showing a modification, Fig. 7 (Sheet 1) is a top plan view showing a third modification of a guiding device, Fig. 8 is a cross section on line VIII—VIII of Fig. 7, Fig. 9 is a longitudinal section through the guiding device on line IX—IX of Fig. 7.

Similar reference numerals denote similar parts in the different views.

Referring now to the drawings in greater detail, and first to Fig. 1, it will be seen that several circular saw blades 2 are arranged in the lower part of the machine 1, on a shaft 4, so as to project through the machine table 3. The shaft 4 is driven by an electromotor indicated at 5. The workpiece or board 7 is drawn through the machine in the direction of the arrow by means of pressure and feed rollers 8 and 9 mounted for rotation in the upper part 6 of the machine. The two inner feed rollers 9 are arranged at a greater distance from each other in order that the saw blades 2 are able to project over the wood by a sufficient amount. Thus it is ensured that boards with a considerable difference in thickness can be cut without readjusting the saw blades.

My novel guiding device comprises a plate 10 inserted in a complementary rectangular recess 25 of the machine table 3 in place of the ordinary cover plate provided to admit access to the bearings etc. of the circular saw. Mounted in the plate 10 are guide strips 12 and cutting rollers 11, Fig. 3. The pressure and feed rollers 8, 9 are arranged above the guiding device 10, the first row of feed rollers 8 being disposed above the cutting rollers 11.

As will be seen from Figs. 3 and 4 in greater detail, a plurality of narrow guide strips 12 are arranged in the feeding direction on the plate 10 which is inserted in the machine table 3, as explained above, and clamped therein by action of pressure screws 23 threadably engaged in plate 10 in such a way that their hexagonal heads operate in the aperture 24 and abut against the inner surface of the recess 25 provided in the machine table 3. The cylindrical cutting rollers 11 are formed with an annular edge 13 and mounted in the plate 4 for free rotation in front of the guide strips. As the work 7 is drawn in through the feed rollers 8, the edges 13 act to roll or cut small longitudinal grooves into the underside of the wood. The cross section of the guide strips 12 corresponds to that of the edges 13 of the rollers 11; in other words, the guide strips are also formed with edges which engage into the wood or other workpiece on further feeding thereof.

As shown in Figs. 3 and 4, both the annular edges 13 and the guiding edges 12 have a triangular profile with a sharp cutting edge. It has been found that relatively small edges are sufficient to safely guide the work. For instance, the width $b$ of the edges may be about 0.5 mm. and their height may be about 0.7 mm. Since the cutting rollers 11, 13 act to produce fine longitudinal grooves in the wood, there is no jamming between these grooves and the guiding edges 12 and thus no additional friction is caused but the rolled-in grooves actually serve only for guiding the workpiece in a straight direction by cooperation with the edges 12. In other words, the guiding edges 12 do not produce any additional resistance against the feeding motion, since the work is not forced onto these guiding edges, but plainly engages the surface 14 of the plate 4. Therefore, even with heavy workpieces an absolutely reliable straight guidance is ensured even for the pieces of wood which have been separated by passage past the saw blades 2 without requiring an increased feeding force.

It is also contemplated to entirely eliminate any jamming effect between the work and the guiding edges 12 by making the latter somewhat smaller in cross section than the profiles of the annular edges 13. For instance, the annular edges 13 may have a height $h_1$ of 0.9 and a width $b_1$ of 0.7 mm. while the succeeding guiding edges have only a height $h$ of 0.7 and a width $b$ of 0.5 mm. This modification is particularly recommendable where according to the embodiment of Figs. 7 to 9 annular guiding edges 15 on rotary rollers 16 are provided in place of straight-line guiding edges 12.

In the embodiment as per Figs. 5 and 6 each of the guiding edges 12 is arranged on a separate bar or rail 17 and these bars are compressed by means of screw bolts indicated at 19, with spacing rings 18, so as to form a plate, the saw blades 2 projecting through the interstices of the bars 17. In order to be able to produce a wide variety of different widths of ledges or battens, with the same guiding device or with the same bars 17, respectively, the same are made relatively narrow, for insertion of interchangeable spacing rings 18 of different axial length "L." As shown in Fig. 5, the cutting rollers 11 are mounted in corresponding recesses 20 on the front ends of said bars 17.

In the modification shown in Figs. 8 and 9, embodying a simple circular saw with a saw blade 2, a plurality of guide rollers 16 each having several annular guide edges 15 is rotatably mounted in a plate 21 in place of the above mentioned guide strip 17, said plate being adapted to be inserted in a rectangular recess provided in the machine table 3 of the circular saw in place of the normal cover plate usually inserted therein. This modification is particularly adapted for the squaring and cutting of lighter boards. Here again, in accordance with the invention a cutting roller 22 is provided in the plate 21 in front of the guide rollers 16 and formed with annular edges 13 corresponding to the annular edges 15.

It is also contemplated, moreover, to provide in certain cases a grinding device in which guiding edges 12 or guiding strips 17 are combined with guide rollers 16.

It will be understood that any of the above embodiments can be provided not only in newly manufactured circular saws, but it is also possible to subsequently provide existing circular saws with a guide plate such as shown at 10 in Figs. 1 to 4 or at 21 in Figs. 7 to 9 by removing the existing cover plate permitting access to the bearings etc. of the circular saw and inserting instead a guide plate 10, or 21, respectively, which may be fixed by means of screws 23 as indicated in Fig. 3, and mounting on the machine table a conventional feeding apparatus, in such a way that the first feed roller is situated above the cutting roller 11, Fig. 1. Thus a conventional circular saw can be converted into a circular saw with automatic feed and accurate straight guiding of the pieces of wood.

While the invention has been described in detail with respect to certain now preferred examples and embodiments of the invention it will be understood by those skilld in the art after understanding the invention that various changes and modifications may be made without departing from the spirit and scope of the invention and it is intended, therefore, to cover all such changes and modifications in the appended claims.

I claim:

1. A guiding device for wood working machines having a machine table and at least one feed roller above the machine table, said guiding device comprising cutting roller means arranged for cooperation with the feed roller and having triangular annular projecting edges with each edge having a height of approximately 0.7 mm. and a width of approximately 0.5 mm. adapted to produce guide grooves in the lower face of the workpiece, and a plurality of guide rollers each having a corresponding number of projecting edges shaped similar to the projecting edges of the cutting roller and having a height of approximately 0.7 mm. and a width of 0.5 mm. and being arranged behind the cutting roller in an aligned position so that the projecting edges fit into the guide grooves of the workpiece.

2. A guiding device for wood working machines having a machine table and at least one feed roller above the machine table, said guiding device comprising cutting roller means arranged for cooperation with the feed roller and having triangular annular projecting edges with each edge having a height of approximately 0.9 mm. and a width of approximately 0.7 mm. adapted to produce guide grooves in the lower face of the workpiece, and a plurality of guide rollers each having a corresponding number of projecting edges shaped similar to the projecting edges of the cutting roller means and having a height of approximately 0.7 mm. and a width of approximately 0.5 mm. and being arranged behind the cutting roller means in an aligned position so that the projecting edges fit into the guide grooves with a slight clearance thereby preventing jamming between the workpiece and the projecting edge.

3. In combination with a wood working machine having a machine table, feed roller means above the machine table, and a recess in the machine table for insertion of a cover plate, a guiding device comprising a plate member adapted to be inserted in said recess, cutting roller means mounted for rotation in said plate member, said cutting roller means having triangular annular projecting edges with each edge having a height of approximately 0.7 mm. and a width of approximately 0.5 mm., means mounting the cutting roller means below the feed roller means for producing guide grooves in the lower face of the workpiece, and guide means associated with, and arranged behind, the cutting roller means, in an aligned position, said guide means having guiding edges whose cross section corresponds to the cross-section of the associated edge of said cutting roller means and having a height of approximately 0.7 mm. and a width of approximately 0.5 mm. for engagement in the respective guide groove.

4. A circular saw machine comprising a machine table, a plurality of circular saw blades arranged in parallelism, feed roller means above the machine table, and a recess in the machine table for insertion of a cover plate, a guiding device comprising a plurality of spaced bars arranged in parallelism, transverse spacing and connecting means for combining said spaced bars into a plate unit adapted to be inserted in the recess, with variable spacing between the bars, in such a way that the saw blades project through said spacings, at least one projecting guide edge on the top surface of each bar, and a cutting roller mounted for rotation in each bar in front of the guide edge and having a projecting cutting edge adapted to produce in the underside of the workpiece, by cooperation with the feed roller means, a guide groove adapted to be engaged by the associated guide edge, each of said guiding and cutting edges being of triangular cross-section and having a height of approximately 0.7 mm. and a width of approximately 0.5 mm., the cutting edges being slightly the larger thereby eliminating jamming between the workpiece and the guiding edges.

5. A circular saw machine comprising a machine table, a plurality of circular saw blades arranged in parallelism, feed roller means above the machine table, and a recess in the machine table for insertion of a cover plate, a guiding device comprising a plurality of spaced narrow bars arranged in parallelism, transverse connecting rods and interchangeable spacing rings for combining said spaced bars into a plate unit adapted to be inserted in the recess with variable spacing between the bars, in such a way that the saw blades project through said spacings, press screw means adapted to secure the plate in position by tight abutment of the heads of the press screws against the inner surface of the recess, at least one projecting guide edge on the top surface of each bar, and a cutting roller mounted for rotation in each bar in front of the guide edge and having a projecting cutting edge adapted to produce in the underside of the workpiece, by cooperation with the feed roller means, a guide groove adapted to be engaged by the associated guide edge, each of said guiding and cutting edges being of triangular cross-section and having a height of approximately 0.7 mm. and a width of approximately 0.5 mm., the cutting edges being slightly the larger thereby eliminating jamming between the workpiece and the guiding edges.

6. In combination with a wood working machine comprising a machine table and feed rollers for pressing the workpiece onto the machine table, a guiding device comprising idler cutting roller means having annular cutting edges projecting with these cutting edges above the surface of the machine table with each edge being of triangular cross-section and having a height of approximately 0.7 mm. and a width of approximately 0.5 mm., means mounting said idler cutting roller means below one of the feed rollers for producing guide grooves in the lower face of the workpiece, and guiding edges on the machine table arranged behind the projecting edges of the cutting roller means, in an aligned position, each of said guiding edges having a cross section which corresponds to the cross-section of the associated edge of the cutting roller means and having a height of approximately 0.7 mm. and a width of approximately 0.5 mm. for engagement in the respective guide groove.

7. In combination with a wood working machine comprising a machine table and feed rollers for pressing the work-piece onto the machine table, a guiding device comprising cutting roller means having annular projecting edges with each edge being of triangular cross-section with a sharp cutting edge and having a height of approximately 0.7 mm. and a width of approximately 0.5 mm., means mounting the cutting roller means below one of the feed rollers for producing guide grooves in the lower face of the workpiece, and guide strips associated with, and arranged behind, the projecting edges of the cutting roller means, in an aligned position, each of said guide strips having a guiding edge whose cross-section corresponds to the cross-section of the associated edge of said cutting roller means and having a height of approximately 0.7 mm. and a width of approximately 0.5 mm. for engagement in the respective guide groove.

8. A guiding device for wood working machines having a machine table and feed roller means above the machine table, said guiding device comprising cutting roller means having annular projecting edges, with each edge being of triangular cross-section with a sharp cutting edge and having a height of approximately 0.9 mm. and a width of approximately 0.7 mm., means mounting the cutting roller means for cooperation with the feed roller means, said cutting roller means being adapted to produce guide grooves in the lower face of the workpiece, and guide strips associated with, and arranged behind, the projecting edges of the cutting roller means, in an aligned position, each of said guide strips having a guiding edge whose cross-section corresponds to the cross-section of the associated edge of said cutting roller means and having a height of approximately 0.7 mm. and a width of approximately 0.5 mm. for engagement in the respective guide groove and to eliminate jamming between the workpiece and the guiding edges.

References Cited in the file of this patent

UNITED STATES PATENTS

| 183,697 | Miller | Oct. 24, 1876 |
| 462,797 | Hazard | Nov. 10, 1891 |
| 714,098 | Caldwell | Nov. 18, 1902 |
| 775,477 | Norlin | Nov. 22, 1904 |
| 984,237 | Osburn | Feb. 14, 1911 |

FOREIGN PATENTS

| 34,660 | Sweden | Apr. 16, 1913 |
| 248,053 | Switzerland | Jan. 16, 1948 |